(12) United States Patent
Veenstra

(10) Patent No.: US 9,731,593 B2
(45) Date of Patent: Aug. 15, 2017

(54) FUEL STORAGE SYSTEM

(75) Inventor: Michael Jon Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2024 days.

(21) Appl. No.: 12/187,751

(22) Filed: Aug. 7, 2008

(65) Prior Publication Data

US 2010/0032934 A1 Feb. 11, 2010

(51) Int. Cl.
*G01K 13/00* (2006.01)
*G01K 1/00* (2006.01)
*B60K 15/01* (2006.01)

(52) U.S. Cl.
CPC ........... *B60K 15/013* (2013.01); *Y02E 60/321* (2013.01)

(58) Field of Classification Search
USPC ................................. 374/148, 141, 143, 208
See application file for complete search history.

(56) References Cited

U.S. PATENT DOCUMENTS

| 4,672,842 A * | 6/1987 | Hasselmann ................... 73/49.2 |
| 4,776,705 A * | 10/1988 | Najjar et al. ................... 374/139 |
| 5,000,580 A * | 3/1991 | Leininger ............. G01J 5/0014 356/44 |
| 5,009,514 A | 4/1991 | Gador |
| 6,270,253 B1 | 8/2001 | Keller |
| 6,394,647 B1 * | 5/2002 | Allmendinger et al. ..... 374/142 |
| 7,001,069 B2 | 2/2006 | Phipps |
| 7,048,839 B2 * | 5/2006 | Harada ......................... 204/266 |
| 7,346,427 B2 * | 3/2008 | Hillam et al. ................ 700/236 |
| 7,537,382 B2 * | 5/2009 | Ibuki et al. .................... 374/144 |
| 8,113,709 B2 * | 2/2012 | Handa ...................... F17C 7/00 141/82 |
| 2002/0104568 A1 * | 8/2002 | Cronimus ............... F16K 27/07 137/551 |
| 2004/0101025 A1 * | 5/2004 | Welker ................... G01K 13/02 374/147 |
| 2004/0174922 A1 * | 9/2004 | Yamashita ........... C21O 5/4673 374/131 |
| 2004/0200735 A1 * | 10/2004 | DaCosta et al. ............... 206/0.7 |
| 2007/0000016 A1 | 1/2007 | Handa |
| 2007/0000562 A1 | 1/2007 | Handa |
| 2010/0024542 A1 * | 2/2010 | Yen et al. .................... 73/290 R |
| 2010/0098130 A1 * | 4/2010 | Kanie ................ 374/1 |
| 2010/0206887 A1 * | 8/2010 | Hashim et al. ............... 220/581 |
| 2013/0306650 A1 * | 11/2013 | Downie ................ F17C 13/023 220/581 |
| 2013/0333774 A1 * | 12/2013 | Downie ................ G01L 9/0022 137/487.5 |

FOREIGN PATENT DOCUMENTS

JP 2007333216 A 12/2007

OTHER PUBLICATIONS

Translation of JP2007333216 (Dec. 27, 2007).*

* cited by examiner

*Primary Examiner* — Mirellys Jagan
(74) *Attorney, Agent, or Firm* — Damian Porcari; Brooks Kushman P.C.

(57) ABSTRACT

A fuel storage vessel includes a valve operatively associated with the storage vessel, a conduit disposed within the vessel and in fluid communication with the valve for delivering a stream of pressurized fuel to the storage vessel and a detector adjacent the conduit for detecting a state of the pressurized fuel in the storage vessel. The detector is positioned outside of the stream of pressurized fuel.

17 Claims, 2 Drawing Sheets

FUEL STORAGE SYSTEM

BACKGROUND

1. Field

The invention relates to fuel storage systems.

2. Discussion

Hydrogen fuel cell vehicles may store hydrogen on-board in pressurized storage systems. Certain storage systems and strategies for delivering fuel to these storage systems are known. As an example, United States Patent Publication No. 2007/0000016 to Handa discloses a high pressure fuel depot refilling line operatively interconnected to an on-board vehicle tank having a gas flow circuit. The refuel gas is circulated within the on board tank to absorb the compression heat of refueling and then to an external radiator before being released into the tank.

SUMMARY

A fuel storage system includes a fuel storage vessel, a valve operatively associated with the vessel and a conduit disposed within the vessel and in fluid communication with the valve for delivering a stream of pressurized fuel to the vessel. The system also includes a detector adjacent the conduit for detecting a state of the pressurized fuel in the vessel. The detector is positioned outside of the stream of pressurized fuel.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

To minimize refueling times associated with fuel cell vehicles, it may be desirable to quickly fill an on-board fuel storage vessel for the fuel cells. The flow rate at which fuel is provided to the storage vessel influences the time it takes to fill the storage vessel.

As known to those of ordinary skill, a temperature of the fuel in the storage vessel during refueling is related to the flow rate (and duration) at which the fuel is provided to the storage vessel. It is also known that, certain storage vessels are rated for certain recommended maximum temperatures. For example, a storage vessel may be designed to provide pressurized storage of a gaseous fuel at maximum storage vessel temperatures less than 85 degrees Celsius.

The temperature at which fuel is provided to a storage vessel is typically less than the rated temperature of the storage vessel. The rated temperature of the storage vessel may thus limit the flow rate at which fuel is provided to the storage vessel.

During certain refueling operations, the temperature of the fuel inside the storage vessel may exceed the temperature of the storage vessel itself (provided the temperature of the storage vessel itself is less than its temperature rated limit.) For example, if the temperature of the storage vessel is 30 degrees Celsius before a refueling operation, the fuel may be provided to the storage vessel at relatively high flow rates to minimize refueling times and thus yield fuel temperatures inside the storage vessel significantly greater than 30 degrees Celsius. Such refueling strategies typically result in the need to monitor fuel temperature and control flow rate to prevent exceeding the storage vessel rated temperature.

Figure 1:
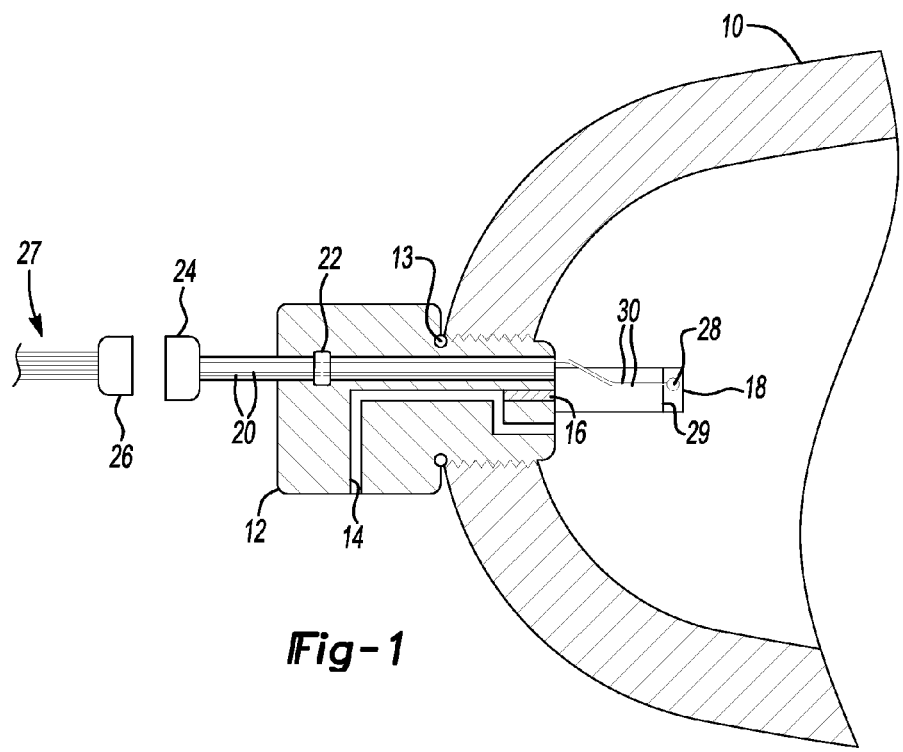
FIG. 1 is a side view, in partial cross-section, of a portion of a fuel storage system for an automotive vehicle.

Referring now to FIG. 1, a pressurized storage system includes a pressurized tank 10 and a valve 12 threadedly engaged with the tank 10. The valve 12 provides a passageway 14 for hydrogen gas to be provided to the tank 10. An O-ring 13 provides a seal between the valve 12 and the tank 10.

A moveable element 16, e.g., plunger, of a solenoid 18 may be positioned by the solenoid 18 to restrict or block the flow of hydrogen gas through the passageway 14. As illustrated in FIG. 1, the moveable element 16 is in the open position, thus allowing hydrogen to flow through the passageway 14. In the closed position (not shown), the moveable element 16 extends into the passageway 14.

The solenoid 18 receives control signals from a vehicle controller (not shown) via a pair of solenoid control wires 20. The solenoid control wires 20 pass through a pressure seal 22 and terminate at an electrical connector 24. The electrical connector 24 is attached with a mating electrical connector 26 of a wiring harness 27 electrically connected with the vehicle controller.

A temperature sensor 28 is disposed within the tank 10 and may be attached to the solenoid 18 via a tie-strap 29. The sensor 28 provides signals indicative of a temperature of the hydrogen within the tank 10 to the vehicle controller via a pair of sensor wires 30. The sensor wires 30 also pass through the seal 22 within the valve 12 and terminate at the electrical connector 24.

Figure 2:
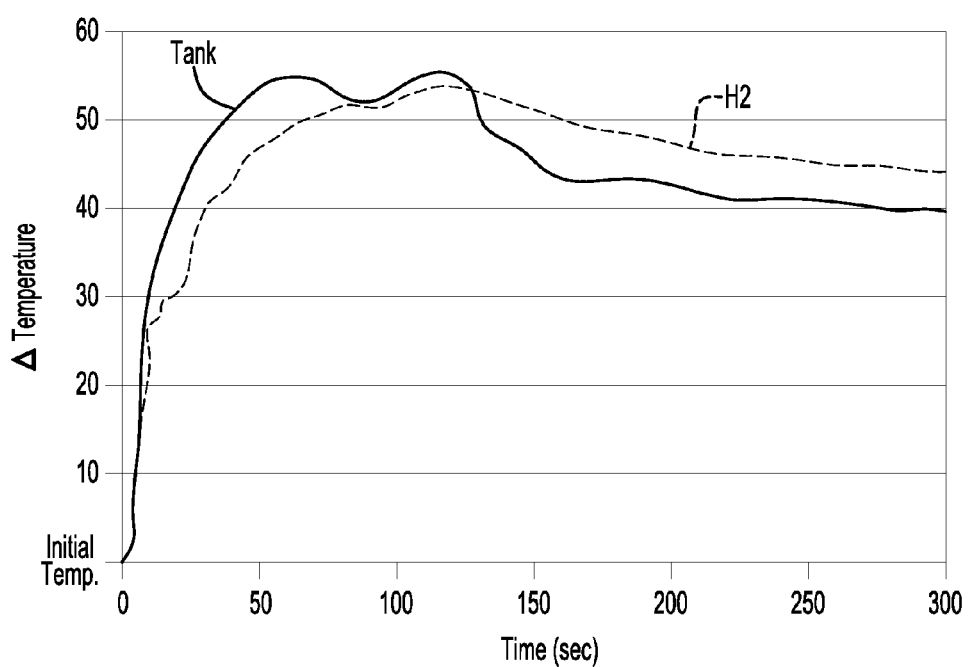
FIG. 2 is an example plot of time versus temperature for the hydrogen storage system of FIG. 1.

Referring now to FIGS. 1 and 2, a temperature of an inner wall of the tank 10 (measured with a temperature sensor not shown) was found to be generally greater than the temperature of the hydrogen (measured with the temperature sensor 28) within the tank 10 during refueling at flow rates expected to yield hydrogen temperatures greater than the inner wall temperature. Analysis revealed that the temperature of the hydrogen within the tank 10 was lower than expected because the temperature sensor 28 was positioned in the general path of the hydrogen entering the tank 10 via the passageway 14. (Hydrogen gas entering the tank 10 was colder than the hydrogen in the tank 10).

Figure 3:
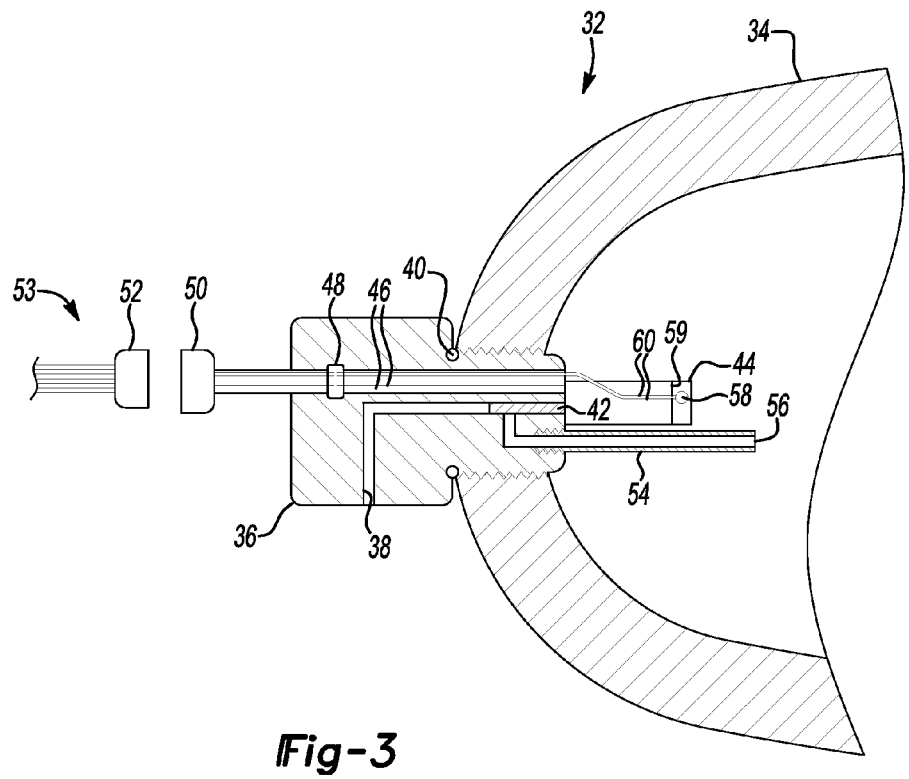
FIG. 3 is a side view, in partial cross-section, of a portion of another fuel storage system for an automotive vehicle.

Referring now to FIG. 3, an embodiment of a fuel storage system 32 for an automotive fuel cell vehicle (not shown) includes a fuel storage vessel 34. Fuel, e.g., hydrogen, etc., may be stored in the storage vessel 34.

A valve 36 is threadedly engaged with the storage vessel 34 and provides a passageway 38 for pressurized fuel to be provided to or removed from the storage vessel 34. A pressure seal 40, e.g., O-ring, provides a seal between the valve 36 and the storage vessel 34. In other embodiments, the valve 36 may be spaced away from the storage vessel 34. In such embodiments, the passageway 38 may be configured to fluidly communicate with the storage vessel 34. Other arrangements are also possible.

A moveable element 42, e.g., plunger, associated with a solenoid 44 may be positioned by the solenoid 44 to restrict or block the flow of pressurized fuel through the passageway 38. As illustrated, the moveable element 42 is in the closed position, thus preventing fuel from passing through the passageway 38. Any suitable technique, however, may be used to control the flow of pressurized fuel through the passageway 38.

The solenoid 44 receives control signals from a vehicle controller (not shown) via a pair of solenoid control wires 46. The solenoid control wires 46 pass through a pressure seal 48 and terminate at an electrical connector 50. The electrical connector 50 may be attached with a mating electrical connector 52 of a wiring harness 53 electrically connected with the vehicle controller.

A conduit 54, e.g., flow tube, is threadedly engaged with the valve 34 and fluidly communicates with the passageway 38. In other embodiments, the conduit 54 may be fixedly attached with the valve 34 or tank 10 in any suitable fashion, e.g., bonded, etc. The conduit 54 extends away from the valve 36 and into the storage vessel 34. An end 56 of the conduit 54 may provide an inlet to the storage vessel 34 if fuel is being provided to the storage vessel 34. The end 56 may also provide an outlet from the storage vessel 34 if fuel is being removed from the storage vessel 34.

A sensor 58, e.g., temperature sensor, pressure sensor, etc., is disposed within the storage vessel 34. In the embodiment of FIG. 3, the sensor 58 is attached to the solenoid 44 with a tie-strap 59 and spaced away from the conduit 54. In other embodiments, the sensor 58 may be attached with the solenoid 44 and/or conduit 54 in any suitable fashion. In still other embodiments, the sensor 58 may not be attached with the solenoid 44 and/or conduit 54. Of course, other configurations are also possible. The sensor 58 is positioned such that it is between the valve 36 and the end 56 of the conduit 54.

The sensor 58 provides signals indicative of a measured parameter, e.g., temperature, pressure, etc., associated with fuel within the storage vessel 34 to the vehicle controller (not shown) via a pair of sensor wires 60. The sensor wires 60 also pass through the seal 48 within the valve 34 and terminate at the electrical connector 50.

Figure 4:
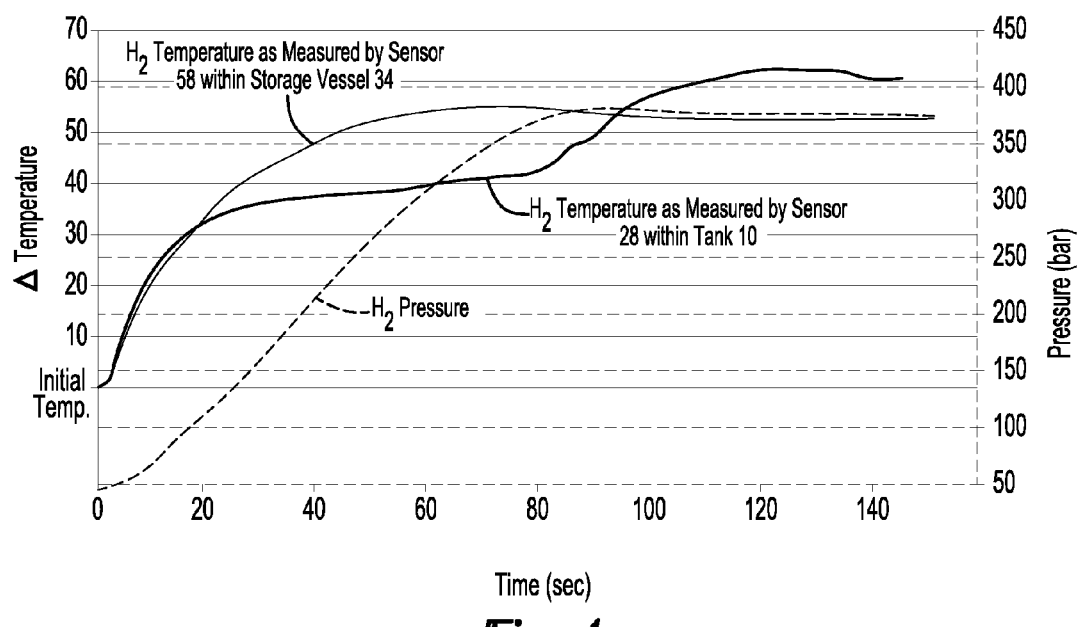
FIG. 4 is an example plot of time versus temperature and pressure for the fuel storage systems of FIGS. 1 and 3.

Referring now to FIGS. 1, 3 and 4, a temperature of hydrogen, as measured by the sensor 28, within the tank 10 during a portion of refueling was less than a temperature of hydrogen, as measured by the sensor 58, within the storage vessel 34 (under the substantially same conditions). The pressures within the tank 10 and storage vessel 34 continued to increase during refueling and leveled off once refueling was complete. Because the sensor 58 was positioned away from the general path of the hydrogen entering the storage vessel 34 via the passageway 38, the temperatures measured by the sensor 58 were more accurate as compared to those measured by the sensor 28.

The inaccurate temperature measurements of the sensor 28 resulted in an over-temperature fill of the tank 10. That is, the temperature of the hydrogen in the tank 10 exceeded the rated temperature limit of the tank 10 after refueling was complete. This over-temperature fill was due to lower than actual temperature values being input into the refueling strategy. As explained above, certain refueling strategies may set refueling flow rates and refueling duration as a function of the temperature inside the storage vessel. The artificially low temperatures measured by the sensor 28 led to an inappropriate fueling strategy, e.g., higher than required flow rates and longer than required refueling duration, and thus an over-temperature fill as compared to the storage vessel 34.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A system comprising:
    a vessel;
    a valve assembly operatively associated with the vessel;
    a conduit disposed within a fuel storage chamber defined by the vessel, in fluid communication with the valve assembly, extending from and away an exposed end face of the valve assembly disposed within the chamber, and terminating at an end portion; and
    a pressure sensor disposed alongside the conduit and between the exposed end face and end portion.

2. The system of claim 1 wherein the sensor is spaced away from the conduit.

3. The system of claim 1 wherein the sensor is attached with the conduit.

4. A vehicle storage system for hydrogen fuel, comprising:
    a vessel;
    a valve assembly attached with the vessel for selectively accessing fuel in a fuel storage chamber defined by the vessel;
    a conduit disposed within the chamber and in fluid communication with the valve assembly for delivering the fuel to the chamber, the conduit extending from and away an exposed end face of the valve assembly disposed within the chamber and terminating at an end portion; and
    a sensor disposed within the chamber and between the exposed end face and end portion for sensing a state of the fuel in the chamber.

5. The system of claim 4 wherein the sensor is attached with the conduit.

6. The system of claim 4 wherein the sensor comprises a temperature sensor.

7. The system of claim 4 wherein the sensor comprises a pressure sensor.

8. The system of claim 4 wherein the sensor is spaced away from the conduit.

9. The system of claim 4 wherein the conduit comprises a tube.

10. The system of claim 4 wherein the valve assembly includes a seal to isolate the fuel within the chamber and wherein the sensor is electrically connected with a wire that passes through the seal.

11. A hydrogen fuel storage system for an automotive vehicle, comprising:
    a hydrogen storage tank;
    a valve assembly attached with the storage tank;
    a tube disposed within a fuel storage chamber defined by the storage tank and in fluid communication with the valve assembly for at least one of delivering hydrogen to and removing hydrogen from the storage tank, the tube extending from and away an exposed end face of the valve assembly disposed within the chamber and terminating at an end through which the hydrogen at least one of exits and enters the tube; and
    a sensor disposed adjacent the tube, disposed within the chamber, and between the exposed end face and end for sensing a state of the hydrogen in the storage tank.

12. The system of claim 11 wherein the sensor is attached with the tube.

13. The system of claim 11 wherein the valve assembly includes a solenoid and wherein the sensor is attached with the solenoid.

14. The system of claim 11 wherein the sensor comprises a temperature sensor.

15. The system of claim 11 wherein the sensor comprises a pressure sensor.

16. The system of claim 11 wherein the sensor is spaced away from the tube.

17. The system of claim 11 wherein the valve assembly includes a seal to isolate the hydrogen within the chamber and wherein the sensor includes a wire passing through the seal.

* * * * *